US009880031B2

(12) United States Patent
Lockhart

(10) Patent No.: US 9,880,031 B2
(45) Date of Patent: Jan. 30, 2018

(54) METHOD AND APPARATUS FOR HVAC/R SYSTEM ANALYSIS

(71) Applicant: Douglas Lloyd Lockhart, Cobble Hill (CA)

(72) Inventor: Douglas Lloyd Lockhart, Cobble Hill (CA)

(*) Notice: Subject to any disclaimer, the term of this patent is extended or adjusted under 35 U.S.C. 154(b) by 407 days.

(21) Appl. No.: 14/575,824

(22) Filed: Dec. 18, 2014

(65) Prior Publication Data

US 2015/0177109 A1    Jun. 25, 2015

Related U.S. Application Data

(60) Provisional application No. 61/920,367, filed on Dec. 23, 2013.

(51) Int. Cl.
*G01F 1/00* (2006.01)
*G01K 13/00* (2006.01)
*F24F 11/00* (2006.01)

(52) U.S. Cl.
CPC .............. *G01F 1/00* (2013.01); *F24F 11/001* (2013.01); *G01K 13/00* (2013.01); *F24F 2011/0094* (2013.01); *G01K 2201/00* (2013.01)

(58) Field of Classification Search
CPC ...... G01F 1/00; G01K 13/00; G01K 2201/00; F24F 11/001; F24F 2011/0094; G01M 99/008; G01L 9/00
See application file for complete search history.

(56) References Cited

U.S. PATENT DOCUMENTS

2006/0032246 A1* 2/2006 Kates ................... F24F 3/1603
62/129

* cited by examiner

*Primary Examiner* — Toan Le

(74) *Attorney, Agent, or Firm* — Borden Ladner Gervais LLP; Geoffrey Dekleine

(57) ABSTRACT

A system and method for analyzing an HVAC/R system includes a receiver for receiving signals from sensors, a memory for storing a pressure-enthalpy relationship for refrigerant of the HVAC/R system, a processor in communication with the receiver and the memory, the processor configured to determine a first energy transfer value associated with an air handler of the HVAC/R system based on the received signals from the sensors, determine a second energy transfer value associated with the refrigerant of the HVAC/R system based on the pressure-enthalpy relationship and the received signals from the sensors; and verify the determined first and second energy transfer values by comparing the first energy transfer value with the second energy transfer value.

13 Claims, 4 Drawing Sheets

METHOD AND APPARATUS FOR HVAC/R SYSTEM ANALYSIS

TECHNICAL FIELD

The present disclosure relates to analyzers for HVAC/R systems.

BACKGROUND

At present in the United States approximately 40% of the energy consumed in commercial buildings, and approximately 30% of the energy used in residential homes, is consumed by Heating, Ventilating, Air Conditioning and Refrigeration (HVAC/R) systems. The U.S. Environmental Protection Agency has reported that the operating conditions of approximately 74% of all HVAC/R systems are maladjusted compared to their designed peak efficiency due to these HVAC/R systems being undercharged or overcharged with refrigerant. The energy saved by increasing the efficiency of HVAC/R system could be utilized to reduce the reliance on energy sources, such as oil, gas, and coal.

Analogue pressure gauge manifolds include two round pressure gauges, one for the low pressure side of the system and the other for the high pressure side of the HVAC/R system being serviced. A pressure scale is displayed on the outer perimeter of the round faceplate of each pressure sensor with 2 or 3 corresponding refrigerant saturation temperature scales in inner diameters of the faceplate. A technician observes where the needle of the pressure gauge is overlaying the respective inner diameter refrigerant saturation scale to estimate the boiling/condensing (saturation) temperature for the measured pressure.

In response to the Montreal Protocol Substances that Deplete the Ozone Layer, refrigerant blends have replaced refrigerants containing ozone depleting chlorine. Generally, the refrigerant blends do not have well defined pressure-temperature boiling/condensing point relationships. Further, the three most common refrigerants pre-Montreal Protocol, which were used in greater than 90% of HVAC/R systems, have been replaced with over seventy-five refrigerants commonly used today. The absence of well-defined pressure-temperature relationships and the large number of different refrigerants utilized make monitoring present HVAC/R systems utilizing analogue sensors nearly impossible.

Current digital tools for HVAC/R systems are limited to gathering data associated with a single metric of an HVAC/R system and do not facilitate verification of the accuracy of the measured metric.

Improvements to analyzers for HVAC/R systems are desired.

SUMMARY

One aspect of the invention provides a system for analyzing an HVAC/R system that includes a receiver for receiving signals from at least a dry bulb air temperature sensor, a wet bulb air temperature sensor, a differential air pressure sensor, a refrigerant mass flow sensor, a refrigerant superheat temperature sensor, a refrigerant subcool temperature sensor, a high pressure sensor, and a low pressure sensor, a memory for storing a pressure-enthalpy relationship for a refrigerant of the HVAC/R system, a processor in communication with the receiver and the memory, the processor configured to determine a first energy transfer value associated with an air handler of the HVAC/R system based on the received signals from the dry bulb air temperature sensor, the wet bulb air temperature sensor, and the differential air pressure sensor, determine a second energy transfer value associated with the selected refrigerant of the HVAC/R system based on the pressure-enthalpy relationship and the received signals from the refrigerant mass flow, the refrigerant superheat temperature sensor, the refrigerant subcool temperature sensor, the high pressure sensor, and the low pressure sensor; and verify the determined first and second energy transfer values by comparing the first energy transfer value with the second energy transfer value.

Another aspect of the invention provides that when the determined first and second energy transfer values are verified, the processor is configured to determine, based on the determined first and second energy transfer values, one of an Energy Efficiency Ratio value, a Seasonal Energy Efficiency Ratio value, and a Coefficient of Performance value.

Another aspect of the invention provides that when the determined Energy Efficiency Ratio value, a Seasonal Energy Efficiency Ratio value, and a Coefficient of Performance value does not match a reference energy efficiency value, the processor is configured to provide an indicator.

Another aspect of the invention provides that the memory and processor are housed in a portable electronic device separate from the receiver.

Another aspect of the invention provides that the portable electronic device communicates with the receiver wirelessly.

Another aspect of the invention provides that the dry bulb air temperature sensor, the wet bulb air temperature sensor, the differential air pressure sensor, the refrigerant mass flow sensor, the refrigerant superheat temperature sensor, the refrigerant subcool temperature sensor, the high pressure sensor, and the low pressure sensor include a transmitter for wirelessly transmitting the signals to the receiver.

Another aspect of the invention provides that the first and second energy transfer values are verified when a difference between the first energy transfer value and the second energy transfer value is less than a predetermined amount.

Another aspect of the invention provides that the predetermined amount is 10% of one of the first energy transfer value and the second energy transfer value.

Another aspect of the invention provides a keypad for selecting the selected refrigerant from a plurality of refrigerants.

Another aspect of the invention provides that pressure-enthalpy relationships for the plurality of refrigerants are stored in the memory.

Another aspect of the invention provides a transmitter for transmitting the signals received at the receiver over a network to facilitate remote monitoring of the HVAC/R system.

Another aspect of the invention provides that the processor is configured to store a log of the received signals in the memory.

Another aspect of the invention provides that the memory is removable.

Another aspect of the invention provides that at least one of the refrigerant superheat temperature sensor and the refrigerant subcool temperature sensor comprises two or more temperature sensors, and the processor is configured to determine, based on the signals from the two or more of temperature sensors, an energy value associated with the energy gained or lost by the selected refrigerant in a conduit of the HVAC/R system, and wherein determining the second energy transfer value is based on the determined energy value.

Another aspect of the invention provides a portable electronic device configured to determine a model number of the HVAC/R system, retrieve information associated with the model number, and store the retrieved information in the memory.

Another aspect of the invention provides that the portable electronic device comprises a camera, and the portable electronic device is configured to capture, utilizing the camera, an image of the model number, and determining the model number comprises determining the model number based on the image.

Another aspect of the invention provides that the portable electronic device is a heads up display.

Another aspect of the invention provides a method of controlling an analyzing system of a HVAC/R system that includes receiving signals from at least a dry bulb air temperature sensor, a wet bulb air temperature sensor, a differential air pressure sensor, a refrigerant mass flow sensor, a refrigerant superheat temperature sensor, a refrigerant subcool temperature sensor, and a high pressure sensor, and a low pressure sensor, determining a first energy transfer value associated with an air handler of the HVAC/R system based on the received signals from the dry bulb temperature sensors, the wet bulb temperature sensors, and differential air pressure sensor, determining a second energy transfer value associated with a refrigerant of the HVAC/R system based a pressure-enthalpy relationship of the refrigerant and the received signal from the refrigerant mass flow sensor, the refrigerant superheat temperature sensor, the refrigerant subcool temperature sensor, the high pressure sensor, and the low pressure sensor, and verifying the determined first and second energy transfer values by comparing the first energy transfer value and the second energy transfer value.

Another aspect of the invention provides that receiving includes wirelessly receiving the signals from at least the dry bulb air temperature sensor, the wet bulb air temperature sensor, the differential air pressure sensor, the refrigerant mass flow sensor, the refrigerant superheat temperature sensor, the refrigerant subcool temperature sensor of the HVAC/R system, the high pressure sensor, and the low pressure sensor.

Another aspect of the invention provides selecting a refrigerant from a plurality of refrigerants.

Another aspect of the invention provides, when the first and second energy transfer values are verified, determining, based on at least one of the determined first and second energy transfer values, one of an Energy Efficiency Ratio, a Seasonal Energy Efficiency Ratio, and a Coefficient of Performance value.

Another aspect of the invention provides comparing the determined Energy Efficiency Ratio value, a Seasonal Energy Efficiency Ratio value, and a Coefficient of Performance value to a reference energy efficiency and providing a an indicator when the determined Energy Efficiency Ratio value, a Seasonal Energy Efficiency Ratio value, and a Coefficient of Performance value does not match the reference energy efficiency value.

Another aspect of the invention provides that verifying comprising determining that a difference between the first energy transfer value and the second energy transfer value is less than a predetermined amount.

Another aspect of the invention provides that the predetermined amount is 10% of one of the first energy transfer value and the second energy transfer value.

Another aspect of the invention provides transmitting the received signals over a network to facilitate remote monitoring of the HVAC/R system.

Another aspect of the invention provides logging the received signals in a memory.

Another aspect of the invention provides that the memory is removable.

Another aspect of the invention provides determining a model number of the HVAC/R system, retrieving information associated with the HVAC/R system based on the model number, and storing the information in a memory.

Another aspect of the invention provides that determining comprises determining the model number based on an image of the model number.

Another aspect of the invention provides that determining the model number and retrieving the information is performed by a portable electronic device.

Another aspect of the invention provides that the portable electronic device is a heads up display.

DRAWINGS

The following figures set forth embodiments in which like reference numerals denote like parts. Embodiments are illustrated by way of example and not by way of limitation in the accompanying figures.

DETAILED DESCRIPTION

Figure 1:
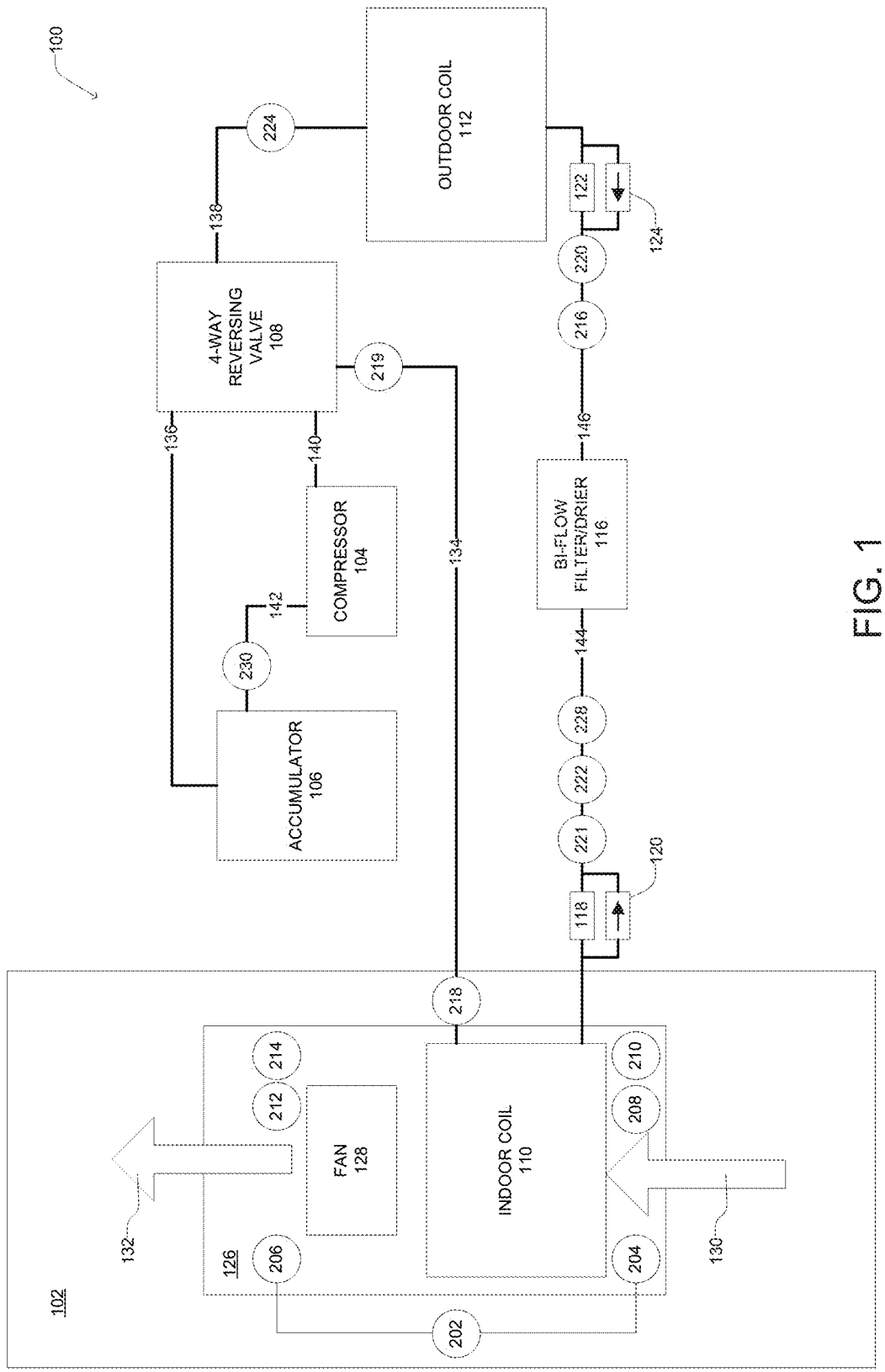
FIG. 1 is a schematic representation of an HVAC/R system including the sensors of an HVAC/R analyzer system according to an embodiment.

The following describes an analyzer system for a Heating, Ventilating, Air Conditioning and Refrigeration (HVAC/R) system. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

FIG. 1 shows an HVAC/R system 100 utilized for conditioning the climate within a structure 102. HVAC/R system 100 comprises a heat pump that may be utilized in a cooling mode to cool the climate within the structure 102, or in a heating mode to heat the climate within the structure 102.

The HVAC/R system 100 includes a compressor 104, an accumulator 106, a 4-way reversing valve 108, an indoor coil 110 housed within the structure 102, an outdoor coil 112 outdoor of the structure 102, a bi-flow filter/dryer 116, an indoor coil thermal expansion valve (TXV) 118, an indoor check valve 120 in parallel with the indoor coil TXV 118, an outdoor coil TXV valve 122 and an outdoor check valve 124 in parallel with the outdoor coil TXV 122. The arrows on the indoor check valve 120 and the outdoor check valve 124 shown in FIG. 1 indicate the direction in which refrigerant may flow through the indoor check valve 120 and the outdoor check valve 124.

As used herein, "outdoor" and "indoor" refer to outside and inside of the structure 102, respectively. The structure 102 may be any enclosure in which the climate may be controlled including, for example, a building, one or more rooms in a building, a cooler, or a refrigerator.

The indoor coil 110 is located within an air handler 126 that includes a fan 128. The fan 128 draws inlet air 130 from the structure 102 into the air handler 126, over the indoor coil 110, and out of the air handler 126 as outlet air 132. The inlet air 130 may be cooled or heated by the indoor coil 110 depending on whether the HVAC/R system 100 is utilized in a cooling mode or a heating mode.

A refrigerant, e.g., "R410a", flows through the HVAC/R system 100 by conduits that connect the various components in a closed loop. A first indoor coil conduit 134 connects a first end of the indoor coil 110 to the 4-way reversing valve 108. An accumulator inlet conduit 136 connects an inlet of the accumulator 106 to the 4-way reversing valve 108. A first outdoor coil conduit 138 connects a first end of the outdoor coil 112 to the 4-way reversing valve 108. A compressor outlet conduit 140 connects an outlet of the compressor 104 to the 4-way reversing valve 108. An accumulator outlet conduit 142 connects an outlet of the accumulator 106 to an inlet of the compressor 104. A second indoor coil conduit 144 connects a second end of the indoor coil 110 to the bi-flow filter/dryer 116. A second outdoor coil conduit 146 connects a second end of the outdoor coil 112 to the bi-flow filter/dryer 116.

The 4-way reversing value 108 is utilized to switch the HVAC/R system 100 between the cooling mode, which can also be an outdoor coil defrosting mode, and the heating mode.

In the cooling mode, the 4-way reversing valve 108 connects the first indoor coil conduit 134 to the accumulator inlet conduit 136, and connects the first outdoor coil conduit 138 to the compressor conduit 140. In the cooling mode, the indoor coil 110 is utilized as an evaporator and the outdoor coil 112 is utilized as a condenser. Liquid refrigerant flows from the bi-flow filter/drier 116 toward the second end of the indoor coil 110 through the indoor coil TXV 118. The liquid refrigerant in the indoor coil 110 absorbs heat from the inlet air 130 that flows over the indoor coil 110, cooling the inlet air 130 and evaporating the refrigerant within the indoor coil 110. The refrigerant vapour exiting the first end of indoor coil 110 is passed to the accumulator 106 via the 4-way reversing valve 108. The accumulator 106 protects the compressor 104 from compression failure caused by unvapourized refrigerant entering the compressor 104. The compressor 104 compresses the refrigerant vapour, increasing the pressure and, consequently, increasing the temperature of the refrigerant vapour. The pressurized refrigerant vapour flows toward the first end of the outdoor coil 112 via the 4-way reversing valve 108. The refrigerant vapour in the outdoor coil 112 loses heat to the environment surrounding the outdoor coil 112, condensing the refrigerant in the outdoor coil 112 to a liquid. An optional outdoor fan (not shown) may be utilized to move air over the outdoor coil 112 to facilitate heat exchange from the refrigerant to the air. The liquid refrigerant that exits the second end of the outdoor coil 112 flows through the outdoor coil check valve 124, the bi-flow filter/dryer 116, and the indoor coil TXV 118, repeating the cooling cycle.

In the heating mode, the 4-way reversing valve 108 connects the first outdoor coil conduit 138 to the accumulator conduit 136, and connects the compressor conduit 140 to the first indoor coil conduit 134. In the heating mode the indoor coil 110 is utilized as the condenser and the outdoor coil 112 is utilized as the evaporator. Pressurized refrigerant vapour from the compressor 104 flows toward the first end of the indoor coil 110 via the 4-way reversing valve 108. The pressurized refrigerant vapour loses heat to the inlet air 130 flowing over the indoor coil 110, heating the inlet air 130, and condensing the refrigerant to a liquid. The fan 128 of the air handler 126 blows the heated outlet air 132 into the structure 102, heating the environment within the structure. The liquid refrigerant that exits the second end of the indoor coil 110 passes through the indoor check valve 120, the bi-flow filter/dryer 116, and the outdoor coil TXV 122 and toward the second end of the outdoor coil 112 where the refrigerant absorbs heat from the environment surrounding the outdoor coil 112, causing the liquid refrigerant to evaporate. An optional outdoor fan (not shown) may be utilized to move air over the outdoor coil 112 to facilitate heat exchange between the air and the refrigerant in the outdoor coil 112. The refrigerant vapour that exits the first end of the outdoor coil 112 flows to the accumulator 106 via the 4-way reversing valve 108, then to the compressor 104, which compresses the refrigerant vapour. The compressed refrigerant vapour flows back to the indoor coil 110, repeating the heating cycle.

FIG. 1 also illustrates the locations of sensors that may be utilized by an HVAC/R analyzing system for analyzing and monitoring the operation of the HVAC/R system 100.

The air handler 126 includes a differential air pressure sensor 202 that includes an inlet air pressure sensor 204 that measures the pressure of the inlet air 130 entering the air handler 126 and an outlet air pressure sensor 206 to measure the pressure of the outlet air 132 exiting the air handler 126. The differential air pressure sensor 202 determines a difference of the pressures measured by the inlet air pressure sensor 204 and the outlet air pressure sensor 206. The air handler 126 also includes an inlet wet bulb temperature sensor 208 that measures the wet bulb temperature of the inlet air 130, an inlet dry bulb temperature sensor 210 that measures the dry bulb temperature of the inlet air 130, an outlet wet bulb temperature sensor 212 that measures the wet bulb temperature of the outlet air 132, and an outlet dry bulb temperature 214 sensor that measures the dry bulb temperature of the outlet air 132.

In the cooling mode, the inlet wet bulb temperature sensor 208 and the outlet wet bulb temperature sensor 212 are utilized to determine the wet bulb temperature difference of the outlet air 132 compared to the inlet air 130, also known as the latent cooling of the air handler 126. The inlet dry bulb temperature sensor 210 and the outlet dry bulb temperature sensor 214 are utilized to determine the dry bulb temperature difference of the outlet air 132 compared to the inlet air 130, also known as the sensible cooling of the air handler 126.

In the heating mode, the inlet dry bulb temperature sensor 210 and the outlet dry bulb temperature sensor 214 are utilized to determine the dry bulb temperature difference of the outlet air 132 compared to the inlet air 130, also known as the sensible heating of the air handler 126. Because the inlet air 130 is not latently heated in the heating mode, the inlet wet bulb temperature sensor 208 and the outlet wet bulb temperature sensor 212 may be omitted in the heating mode, or the measurements from the inlet wet bulb temperature sensor 208 and the outlet wet bulb temperature sensor 212 may be ignored.

The HVAC/R analyzing system also includes sensors that are coupled to the conduits to take measurements of the refrigerant flowing through the HVAC/R system 100.

In a cooling mode, a first mass flow sensor 216, located along the second outdoor coil conduit 146, measures the mass flow of liquid refrigerant exiting the second end of the outdoor coil 112. A first superheat temperature sensor 218, located along the first indoor coil conduit 134 near the indoor coil 110, and a second superheat temperature sensor 219, located along the first indoor coil conduit 134 near the 4-way reversing valve 108, measure the temperature of the refrigerant vapour at either end of the first indoor coil conduit 134. A first subcool temperature sensor 220, located along the second outdoor coil conduit 146 near the outdoor coil TXV 122, and a second subcool temperature sensor 221 located along the second indoor coil conduit 144 near the indoor coil TXV 118, measure the temperature of the liquid refrigerant prior to passing into the indoor coil 110 via the indoor coil TXV 118.

In a heating mode, a second mass flow sensor 222, located along the second indoor coil conduit 144, measures the mass flow of the liquid refrigerant exiting the indoor coil 110. A third superheat temperature sensor 224, located along the first outdoor coil conduit 138, measures the temperature of the refrigerant vapour exiting the first end of the outdoor coil 112. The first subcool temperature sensor 220 and second subcool temperature sensor 221 measure the temperature of the liquid refrigerant prior to passing into the outdoor coil 112 via the outdoor coil TXV 122. The first and second superheat temperature sensors 218, 219 measure the temperature of the refrigerant in the first indoor coil conduit 134.

Utilizing two indoor coil superheat temperature sensors 218, 219 facilitates determining the heat lost or gained by the refrigerant transiting between the indoor coil 110 and the 4-way reversing valve 108 via the first indoor coil conduit 134. Utilizing two subcool temperature sensors 220, 221 facilitates determining heat lost or gained by the refrigerant transiting between the indoor coil 110 and the outdoor coil 112 via the second indoor coil conduit 144 and the second outdoor coil conduit 146. The determined heat lost or gained by the refrigerant may be utilized when determining the energy transferred by the refrigerant of the HVAC/R system 100 such that the determined energy transfer value is associated with the energy utilized to heat or cool the inlet air 130 in the air handler 126, as discussed in more detail below. Alternatively, in cases in which the heat lost or gained in the first indoor coil conduit 134, the second indoor coil conduit 144, and the second outdoor coil conduit 146 is known or is not significant for the purposes of determining the energy transferred by the refrigerant of the HVAC/R system 100, one of the superheat temperature sensors 218, 219 and one of the subcool temperature sensors 220, 221 may be omitted.

The HVAC/R analyzing system also includes a high pressure sensor 228, located on the second indoor coil conduit 144, and a low pressure sensor 230, located on the accumulator outlet conduit 142. The high pressure sensor 228 and the low pressure sensor 230 measure the pressure of the refrigerant within the conduits at the sensor locations. Alternatively, rather than being located on the second indoor coil conduit 144 as shown in FIG. 1, high pressure sensor 228 may be located on the second outdoor coil conduit 146.

Figure 2:
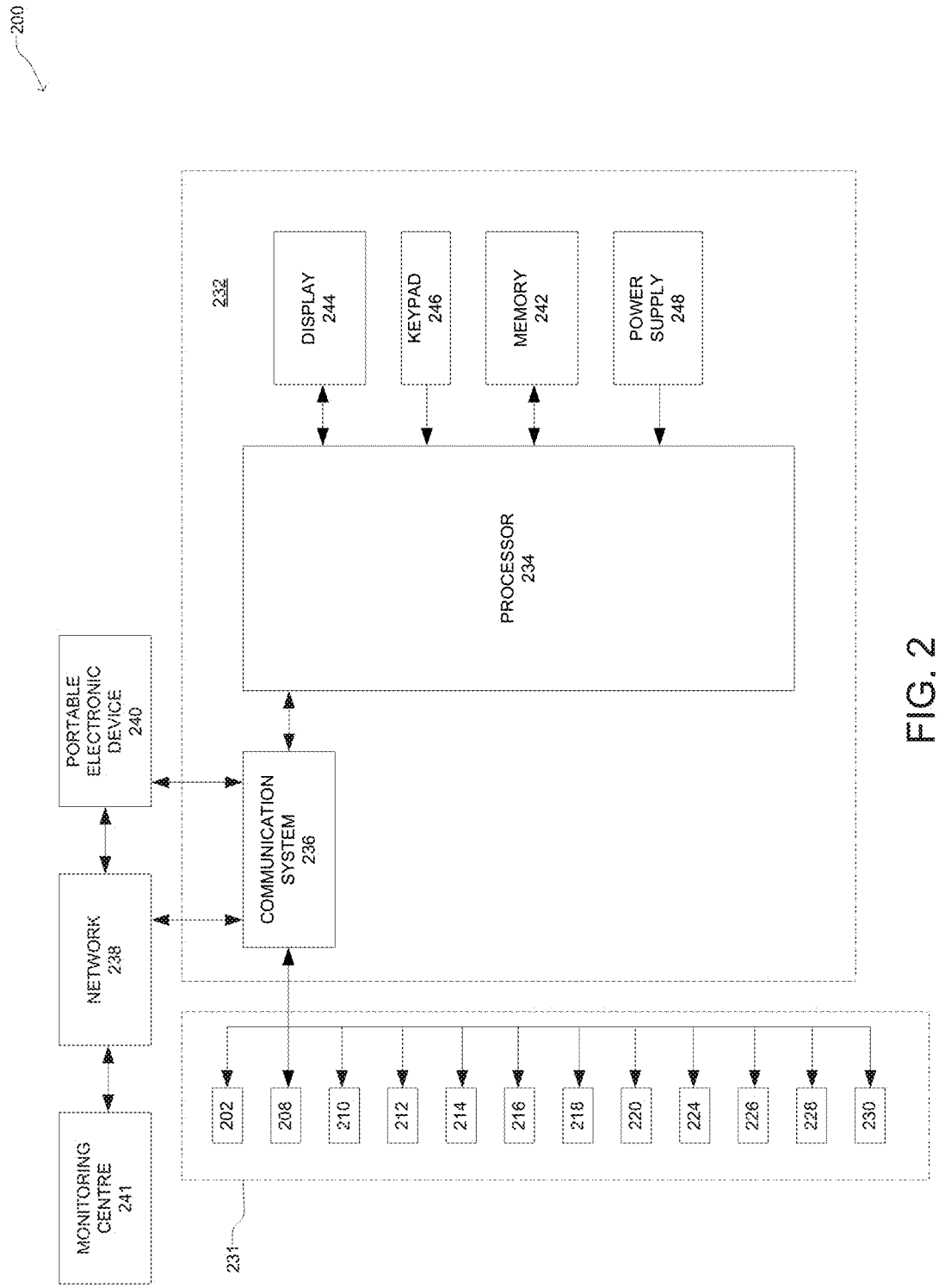
FIG. 2 is a block diagram of an example HVAC/R analyzer system for use in the HVAC/R system illustrated in FIG. 1.

Referring to FIG. 2, a block diagram of an example HVAC/R analyzing system 200 is shown. The HVAC/R analyzing system 200 may be utilized to analyze and monitor an HVAC/R system 100, such as the HVAC/R system 100 illustrated in FIG. 1. The HVAC/R analyzing system 200 includes the differential air pressure sensor 202, the inlet wet bulb temperature sensor 208, the inlet dry bulb temperature sensor 210, the outlet wet bulb temperature sensor 212, the outlet dry bulb temperature sensor 214, the first mass flow sensor 216, the first superheat temperature sensor 218, the second superheat sensor 219, the first subcool temperature sensor 220, the second subcool temperature sensor 221, the second mass flow sensor 222, the third superheat temperature sensor 224, the high pressure sensor 228, and the low pressure sensor 230. The sensors of the HVAC/R analyzing system 200 are collectively referred to herein as the sensors 231. The sensors 231 may be located within an HVAC/R system 100 as described previously with reference to FIG. 1. The HVAC/R analyzing system 200 may also include additional sensors not shown in FIG. 1 such as, for example, amperage sensors, voltage sensors, a weigh scale, and a micron gauge. The amperage sensors and voltage sensors may be utilized to measure the amperage and the voltage, respectively, input into any or all of the compressor 104, the fan 128 of the air handler 126, or an optional outdoor fan (not shown). A micron gauge may be utilized to determine when deep vacuum is created in the HVAC/R system 100 by evacuating air out of the HVAC/R system 100 prior to charging the HVAC/R system 100 with refrigerant. A weigh scale may be utilized to measure the refrigerant charge in the HVAC/R system 100.

The HVAC/R analyzing system 200 also includes a Digital Refrigeration System Analyzer (DRSA) unit 232. The DRSA unit 232 includes a processor 234 that controls the overall operation of the DRSA unit 232.

DRSA unit 232 includes a communication system 236 to transmit and receive data. The sensors 231 of the HVAC/R analyzing system 200 transmit the sensed values by a signal that is received by the communication subsystem 236. The sensors 231 of the HVAC/R analyzing system 200 may transmit the signals wirelessly by, for example, a low power secure wireless communications method. The wireless sensor signals are received by a low power secure wireless communications enabled receiver of the communication system 236.

The DRSA unit 232 includes a memory 242. The memory 242 may be removable from the DRSA unit 232, or the memory 242 may be a memory dedicated to the DRSA unit 232. The memory 242 may store, for example, an operating system that is executed by the processor 234. The memory 242 may also store other information utilized for monitoring the HVAC/R system 100 such as, for example, a list of refrigerants of the HVAC/R system 100 and look-up tables. The look-up tables may be associated, for example, with the refrigerants included in the list of refrigerants such as, for example, pressure-temperature coefficient tables and pressure-enthalpy tables for different refrigerants. The look-up tables may also include manufacturer recommended operating metrics for the HVAC/R system 100, psychometric charts utilized to determine sensible cooling, latent cooling, and sensible heating, and tables correlating differential air pressures to air flow rates for the air handler 126 of the HVAC/R system 100, known as a DAP:Air Flow chart for the air handler 126. The memory 242 may also store information regarding the electrical usage of the HVAC/R system 100 including, for example, the voltage, the amperage, and the electrical power input into the HVAC/R system 100, or into specific components of the HVAC/R system 100 such as, for example, the fan 128 and the compressor 104. The memory 242 may also be utilized to store in a data log the data measured by the sensors 231.

The communication system 236 may transmit and receive data over a network 238. Transmitting and receiving data over the network 238 facilitates controlling the DRSA unit 232, as well as monitoring the HVAC/R system 100, remotely over the network 238. The communication system 236 may communicate with the network 238 wirelessly by, for example, a low power secure wireless communication method or cellular communication. The network 238 may include, for example, the internet, a cellular network, or a local area network. The communication system 236 may be utilized to download the information stored in the memory 242, such as the list of refrigerants and the look-up tables described above, over the network 238.

A portable electronic device 240 may communicate with the DRSA unit 232. The portable electronic device may communicate with the DRSA unit 232 directly via the communication system 236 or indirectly via the network 238. The portable electronic device 240 may be, for example, a laptop computer, a tablet computer, a cellular phone, or a heads up display. The portable electronic device 240 may directly communicate with the DRSA unit 232 wirelessly by, for example, a low power secure wireless communication method or cellular communication.

In an embodiment, the portable electronic device 240 is configured to determine a model number of the HVAC/R system 100 and retrieve via the network 238 information associated with the HVAC/R system 100 such as, for example, look-up tables, manufacturer recommended operating metrics, DAP:Air Flow charts, and electrical consumption information associated with the HVAC/R system 100. The portable electronic device 240 may be configured to communicate the retrieved information associated with HVAC/R system 100 to the DRSA unit 232. In an example, the portable electronic device 240 may be configured to utilize a camera to image a model number printed on a component of the HVAC/R system 100, analyze the image to determine the model number of the HVAC/R system 100, and utilize the determined model number to retrieve the information associated with the HVAC/R system 100 via the network 238. In an example, the portable electronic device 240 is configured to retrieve the information from the manufacturer's website. In an embodiment, the portable electronic device is a heads up display that is wearable by an operator of the HVAC/R analyzing system 200. The heads up display is configured to communicate with the DRSA unit 232 and to display a readout of the parameters of the HVAC/R system 100 determined by the DRSA unit 232. The heads up display may be configured to utilize a camera of the heads up display to image a model number of the HVAC/R system 100, determine the model number of the HVAC/R unit 100 by analyzing the image, and retrieve information associated with the HVAC/R system 100 via the network 238.

A monitoring centre 241 may communicate with the DRSA unit 232 via the network 238 to remotely control the HVAC/R analyzing system 200 or to monitor the HVAC/R system 100. The monitoring centre may include a "virtual DRSA unit" having embedded software and functionality that mirrors the DRSA unit 232 to facilitate remote monitoring the HVAC/R system 100 utilizing the data sent to the remote monitoring centre 241 from the DRSA unit 232. The monitoring centre 241 may also communicate with the portable electronic device 240 via, for example, the network 238.

One or both of the portable electronic device 240 and the monitoring centre 241 may download data from the DRSA unit 232 such as, for example, a data log stored in the memory 242, or upload data onto the memory 242 of the DRSA unit 232 such as, for example, pressure-temperature relationships for specific refrigerants and manufacturer recommended operating metrics for specific HVAC/R systems 100. One or both of the portable electronic device 240 and the monitoring centre 241 may be utilized to remotely control the HVAC/R analyzing system 200 and monitor the HVAC/R system 100 in real time. For example, one or both of the portable electronic device 240 and the monitoring centre 241 may receive the signals from the sensors 231, or may receive other real-time data associated with the HVAC/R system 100 such as, for example, real-time operating metrics of the HVAC/R system 100, via the communication system 236 of the DRSA unit 232. One or both of the portable electronic device 240 and the monitoring centre 241 may receive an indicator from the DRSA unit 232 if the DRSA unit 232 determines that the HVAC/R system 100 is not performing optimally, as is discussed in more detail below.

The DRSA unit 232 may include a display 244 to output information to a user and a keypad 246 to enable a user to provide input to the DRSA unit 232. A power supply 248, such a battery or an external power supply, powers the DRSA unit 232.

Figure 3:
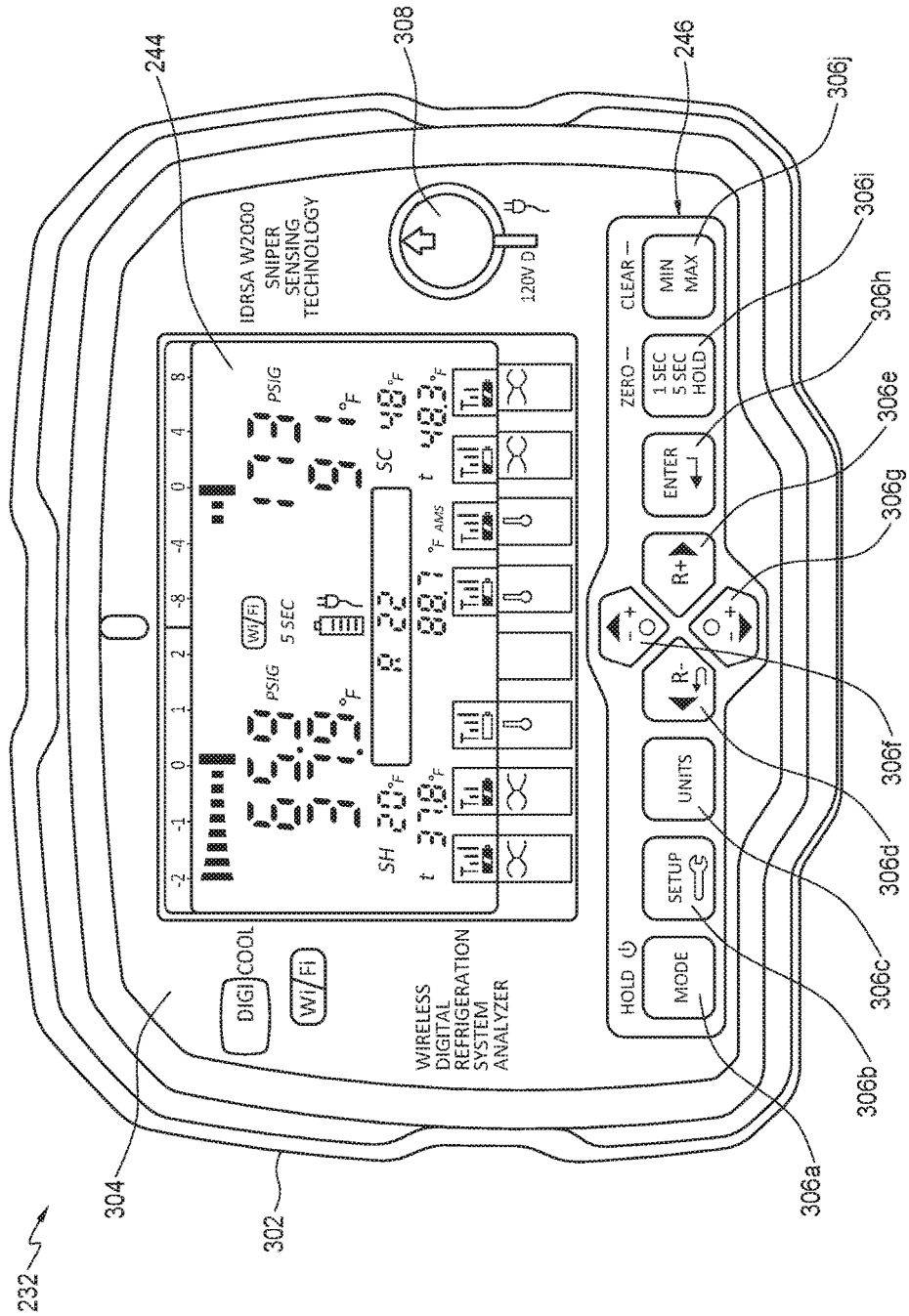
FIG. 3 is a front view of an example digital refrigeration HVAC/R analyzing unit utilized in the digital HVAC/R analyzer system shown in FIG. 2.

A front view of an example of a DRSA unit 232 is shown in FIG. 3. The DRSA unit 232 includes a housing 302 that encloses the components such as shown in FIG. 2. The housing 302 may include a back, sidewalls, and a front 304 that frames the display 244 and the keys 306a through 306j of the keypad 246. The housing 302 also includes a power port 308 for plugging an external power supply into the DRSA unit 232 to power the DRSA unit 232 and to recharge the battery.

The keypad 246 shown in the example of FIG. 3 includes ten keys 306a through 306j: a MODE/ON-OFF key 306a; a SETUP key 306b; a UNITS key 306c for selecting the type of units for displayed values, i.e., metric or non-metric; a LEFT directional key 306d for moving leftwardly through a menu, as well as selecting a refrigerant; a RIGHT directional key 306e for moving rightwardly through a menu, as well as selecting a refrigerant; an UP directional key 306f for moving upwardly through a menu, as well as increasing the contrast of the display 244; a DOWN directional key 306g for moving downwardly though a menu, as well as decreasing the contrast of the display 244; an ENTER key 306h; an update interval selection key 306i for selecting the interval between updates of the displayed values, e.g., one second, five seconds, or no updates; a MIN/MAX key 306j for displaying the minimum or maximum values based on, for example, logged data of the measured values.

In the present example, the display 244 includes six lines, as illustrated in FIG. 3. The first line, shown as the uppermost line of the display 244 in the example of FIG. 3, comprises two bar graphs, one for the low pressure side and one for the high pressure side, which indicate the pressure deviation, either up or down, from the currently displayed values. The second line, immediately below the first line in the example shown in FIG. 3, displays the measured high and low refrigerant pressures along with the units of measurement and the update interval. The third line displays the saturation temperatures of the selected refrigerant, which, in the case of a blended refrigerant, are called the bubble point temperature and dew point temperature. The saturation temperatures are determined by a look-up table associated with the selected refrigerant. The third line also displays the battery status of the DRSA unit 232. The fourth line displays the refrigerant superheat temperature (SH) and subcool temperature (SC), as well as the refrigerant type. The fifth line displays the temperatures determined by the subcool temperature sensor and the superheat temperature sensor, as well as the ambient temperature. The sixth line displays the status of the sensors that are wirelessly communicating with the DRSA unit 232, including the signal strength and the battery status of each sensor. Additional display items may be included, as desired, such as refrigerant weight, discharged weight, etc.

In an alternative embodiment (not shown), user interface elements, including the display 244 and the keys 306a through 306j, of the DRSA unit 232 may be omitted. In this embodiment, the DRSA unit 232 functions as a "black box" unit that may receive signals from the sensors 231, may transmit data from the sensors 231 via the network 238, and may log the data received from the data to be collected at a later time by, for example, removing a removable memory 242 from the DRSA unit 232 or by uploading the data to a portable electronic device 240 or a monitoring centre 241.

Figure 4:
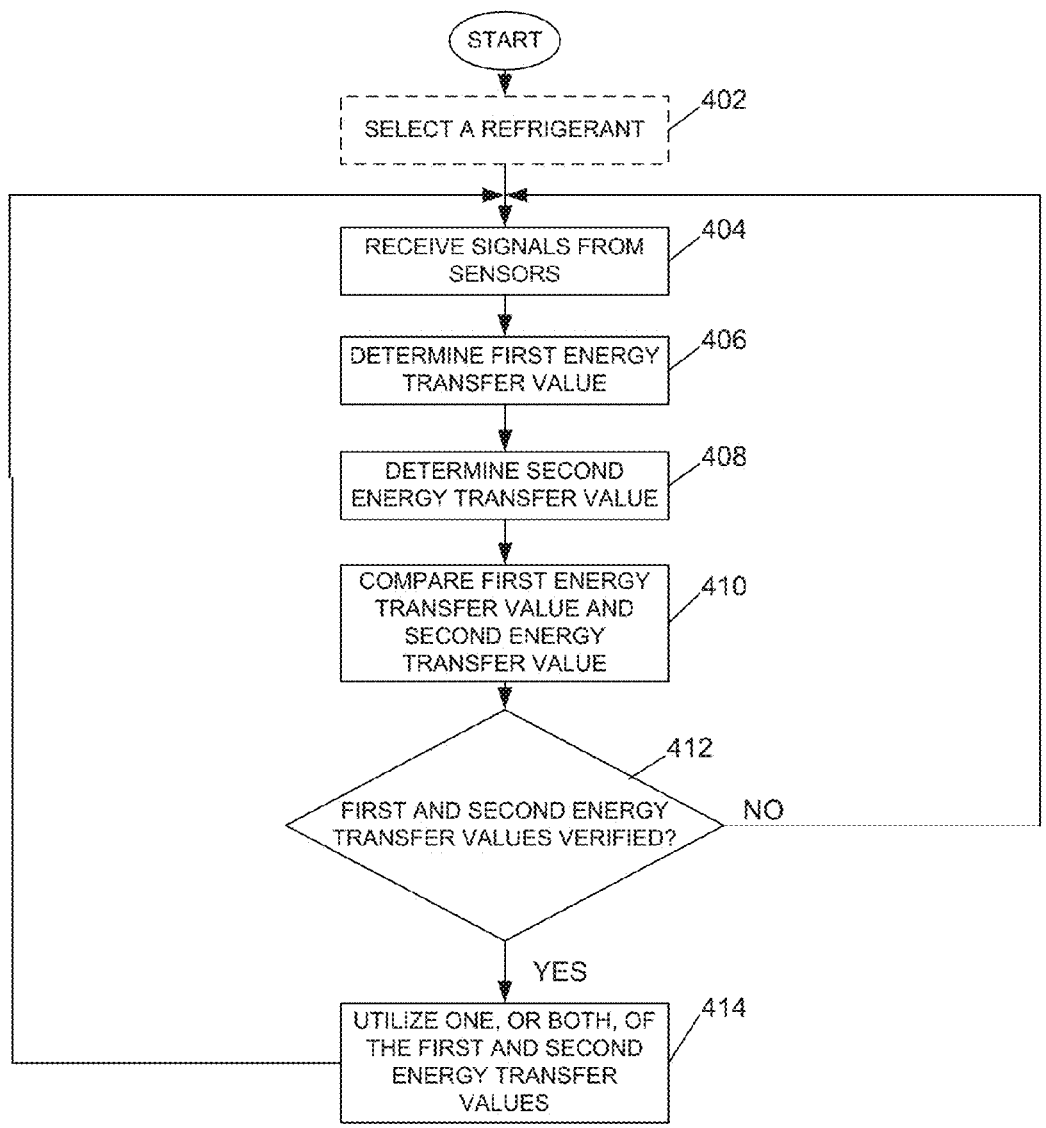
FIG. 4 is a flow chart illustrating a method of controlling the HVAC/R analyzer system shown in FIG. 2.

A flowchart illustrating a method of analyzing an HVAC/R system is shown in FIG. 4. The method illustrated in FIG. 4 may be carried out by computer-readable code executed by, for example, the processor 234 of the DRSA unit 232. The method may also be carried out by computer-readable code executed by, for example, the processor of the portable electronic device 240 or the monitoring centre 241. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable medium.

Optionally, a refrigerant is selected at 402. The refrigerant may optionally be selected from among a list of refrigerants. A list of refrigerants, along with associated data for each listed refrigerant, may be stored, for example, in the memory 242 of the DRSA unit 232. The associated data for a listed refrigerant may include, for example, pressure-temperature relationships for that refrigerant. An operator may select a refrigerant from the stored list of refrigerants utilizing the refrigerant selection keys 306d, 306g on the DRSA unit 232. In response to selecting the refrigerant, the DRSA unit 232 may retrieve information associated with the selected refrigerant via the network 238.

In embodiments in which the selection of a refrigerant is not included, the refrigerant utilized in the HVAC/R system 100, along with associated data for the refrigerant, may be, for example, pre-programmed into the DRSA unit 232.

Signals from at least some of the sensors 231 of the HVAC/R analyzing system 200 are received at the DRSA unit 232 at 404. Signals may be received from the differential air pressure sensor 202, the inlet wet bulb temperature sensor 208, the inlet dry bulb temperature sensor 210, the outlet wet bulb temperature sensor 212, the outlet dry bulb temperature sensor 214, the first mass flow sensor 216, the first superheat temperature sensor 218, the second superheat temperature sensor 219, the first subcool temperature sensor 220, the second mass flow sensor 222, the third superheat temperature sensor 224, the second subcool temperature sensor 221, the high pressure sensor 228, and the low pressure sensor 230. Signals from the sensors 231 may be received at the DRSA unit 232 through the communication system 236. Sensor signals may be received wirelessly by low power secure wireless communication, or may be received through wires connecting the sensors 231 to the communication system 236.

Alternatively, the DRSA unit 232 may receive signals directly from the input air pressure sensor 204 and the outlet air pressure sensor 206, rather than receiving a signal from a differential air pressure sensor 202. In this case, the differential air pressure of the air handler 126 may be determined by for example, the processor 234.

An energy transfer value associated with the air handler 126, referred to herein as a first energy transfer value, is determined at 406. The first energy transfer value associated with the air handler 126 is associated with the total amount of energy that is removed from, in a cooling mode, or added to, in a heating mode, the inlet air 130 that flows through the air handler 126.

In the cooling mode, the first energy transfer value may be determined by, for example, utilizing the signals from the differential air pressure sensor 202, the inlet wet bulb temperature sensor 208, the inlet dry bulb temperature sensor 210, the outlet wet bulb temperature sensor 212, and the outlet dry bulb temperature sensor 214 together with an electronic chart such as, for example, a psychometric chart, to determine the sensible and latent cooling and, thus, the total cooling per unit of inlet air 130 flowing through the air handler 126. In the heating mode, the first energy transfer value may be determined by, for example, utilizing the signals from the differential air pressure sensor 202, the inlet dry bulb temperature sensor 210, and the outlet dry bulb temperature sensor 214 together with an electronic chart such as, for example, a psychometric chart, to determine the sensible heating and, thus, the total heating per unit of inlet air 130 flowing through the air handler 126. Utilizing the signals from the differential air pressure sensor 202, the air flow rate through the air handler 126 may be determined utilizing the manufacturer's DAP:Air Flow chart values for the particular air handler 126 utilized in the HVAC/R system 100. Utilizing the determined heating or cooling per unit of inlet air 130 flow and the air flow rate of the air handler 126, the total amount of energy being removed, in the cooling mode, or added, in the heating mode, in the air handler 126 can be determined, which is the first energy transfer value.

An energy transfer value associated with the selected refrigerant flowing through the HVAC/R system 100, referred to herein as a second energy transfer value, is determined at 408. The second energy transfer value associated with the selected refrigerant is associated with the quantum of energy that is moved by the refrigerant of the HVAC/R system 100 in order to heat or cool the inlet air 130 flowing through the air handler 126.

In a cooling mode, the second energy transfer value is determined utilizing signals from the first mass flow sensor 216, the first superheat temperature sensor 218, the second superheat temperature sensor 219, the first subcool temperature sensor 220, the second subcool temperature sensor 221, the high pressure sensor 228, and the low pressure sensor 230. The signals from these sensors are utilized to "plot" a Mollier diagram of the refrigeration cycle in the cooling mode. The Mollier diagram may be plotted utilizing pressure-enthalpy software executed by the processor 234. An example of pressure-enthalpy software that may be utilized for plotting the Mollier diagram is the "Cycle D" program by the National Institute of Standards and Technology (NIST). Utilizing the Mollier diagram, along with the mass flow of refrigerant, the quantum of energy that is moved by the refrigerant in the HVAC/R system 100 is determined, which is the second energy transfer value.

As discussed above, utilizing two superheat temperature sensors 218, 219 facilitates determining the heat lost or gained by the refrigerant in the first indoor coil conduit 134, and utilizing two subcool temperature sensors 220, 221 facilitates determining heat lost or gained in the second indoor coil conduit 144 and the second outdoor coil conduit 146. The amount of heat lost or gained by the refrigerant in the conduits 134, 144, 146 may be accounted for such that the second energy transfer value is associated with the energy that the refrigerant removes from the inlet air 130 to cool the inlet air 130 in the air handler 126. As described above, in cases in which the heat lost or gained by the refrigerant in the conduits 134, 144, 146 is insignificant or is a known amount, the signals from one of the first and second superheat temperature sensors 118, 119 and one of the first and second subcool temperature sensors 220, 221 may be utilized and the signals from other of the first and second superheat temperature sensors 118, 119 and the first and second subcool temperature sensors 220, 221 may be ignored.

Alternatively, the signals from the second mass flow sensor 222 may be utilized rather than signals from the first mass flow sensor 216, and the signals from third superheat temperature sensor 224 may be utilized rather than the signals from the first superheat temperature sensor 218 and the second superheat temperature sensor 219 to determine the second energy transfer value in the cooling mode.

In a heating mode, the second energy transfer value is determined utilizing the signals from the second mass flow sensor 222, the first superheat temperature sensor 218, the second superheat temperature sensor 219, the third superheat temperature sensor 224, the first subcool temperature sensor 220, the second subcool temperature sensor 221, the high pressure sensor 228, and the low pressure sensor 230 to plot a Mollier diagram, as described above. As described above, the amount of heat lost or gained by the refrigerant in the conduits 134, 144, 146, determined utilizing the first and second superheat temperature sensor 218, 219 and the first and second subcool temperature sensors 220, 221, may be accounted for such that the second energy transfer value is associated with the energy that the refrigerant adds to the inlet air 130 to heat the inlet air 130 in the air handler 126. As discussed above, in the case in which the heat lost or gained by the refrigerant in the conduits 144, 146 is insignificant or is a known amount the signals from third superheat temperature sensor 224 and one of the first and second subcool temperature sensors 220, 221 are utilized, and the signals from the first and second superheat temperature sensors 218, 219 and the first and second subcool temperature sensors 220, 221 may be ignored.

Alternatively, rather than utilizing the signals from the second mass flow sensor 222 and the first subcool temperature sensor 220 to determine the second energy transfer value in the heating mode, the signals from the first mass flow sensor 216 and the second subcool temperature sensor 221 may be utilized.

The determined first and second energy transfer values are compared at 410 to verify the accuracy of the determined first and second energy transfer values. The total energy that is transferred to or from the inlet air 130 by the air handler 126 should be equal to amount of the energy that is moved by the refrigerant of the HVAC/R system 100. Under ideal circumstances, the determined first and second energy transfer values may be compared by, for example, determining a difference between the first and second energy transfer values.

The comparison of the first and second energy transfer values is utilized to verify the first and second energy transfer values at 412. For example, the determined first and second energy transfer values may be verified if, for example, the difference between the first and second energy transfer values is less than a predetermined amount. In an example, the predetermined amount is 10% of the maximum determined first energy transfer value or 10% of the maximum determined second energy transfer value.

Verification of the first and second energy transfer values is utilized as a check of the determined energy transfer values. Because the first and second energy transfer values are independently determined, both of the first and second energy transfer values are unlikely to be verified in the case that one or both of the first and second energy transfer values are incorrect. Therefore, verification of the first and second energy transfer values provides an indication of the reliability of the determined first and second energy transfer values, as well as the reliability of measurements provided by the sensors 231 that are utilized to determine the first and second energy transfer values.

If the first and second energy transfer values are not verified at 412, the first and second energy transfer values are discarded, the process returns at 404, and subsequent signals from the sensors 231 are received. If the determined first and second energy transfer values are verified at 412, the process continues at 414 and the first energy transfer value, the second energy transfer value, or both, may be further utilized. For example, the DRSA unit 232 may be programmed to utilize the first energy transfer value, the second energy transfer value, or an average of the first and second energy transfer values.

In the case in which the first and second energy transfer values are not verified, the difference between the first and second energy transfer values may be an indication that the HVAC/R system 100 not operating optimally. The first and second energy transfer values not verifying may also indicate, for example, that the sensors 231 are not operating property, that the refrigerant of the HVAC/R system 100 is not properly charged, that filters in the HVAC/R system 100 require replacing, or that the speed of the fan 128 or the optional outdoor coil fan (not shown) is not optimal.

After the efficiency value is determined at 414, the process returns at 404 and subsequent signals from the sensors are received.

In an embodiment, one, or both, of the determined first and second energy transfer values, together with information of the electricity usage by the HVAC/R system 100, may be utilized to determine an efficiency value of the HVAC/R system 100. The determined efficiency values may be, for example, the Energy Efficiency Ratio (EER), the Seasonal Energy Efficiency Ratio (SEER), or the Coefficient of Performance (COP) of the HVAC/R system 100. As discussed above, the information of the electrical usage by the HVAC/R system 100 may be, for example, stored in the memory 242 of the DRSA unit 232, or may be determined by amperage and voltage sensors at one or more of the compressor 104, the fan 128, and the optional outdoor fan (not shown).

The EER is an efficiency value associated with the cooling output in British thermal units per hour (BTUH) divided by the electrical power (in watts, W) input into the HVAC/R system 100, and is determined at a specified set of indoor and outdoor dry bulb and wet bulb temperature conditions. EER is determined by dividing the determined energy transfer value by the electrical power consumed by the HVAC/R system 100, and is expressed in BTU H/W.

The SEER is an efficiency value associated with the cooling efficiency of an HVAC/R system 100 during a typical cooling-season. The SEER is determined by dividing the determined energy transfer value, measured over a typical cooling season, by the total electrical energy input into the HVAC/R system 100 during the same period, and is expressed in BTU H/W.

The COP of a heat pump is the ratio of the heating energy provided by the HVAC/R system 100 divided by the electrical energy consumed by the heat pump. The COP provides a measure of the performance of the heat pump that is analogous to the thermal efficiency for power cycles.

The determined efficiency value, as well as values determined by the sensors 231 including temperature and pressure measurements, may be compared to the manufacture's recommended operating metrics for the particular HVAC/R system 100, which may include the heating or cooling capacity, the efficiency, and the pressure and temperature values of the refrigerant. The comparison to the manufacture's recommended operating metrics may be utilized to identify if the HVAC/R system 100 is operating at less than the manufacturer's recommended efficiency, wasting energy and indicating a potential issue with the operation of the HVAC/R system 100. For example, if the determined efficiency differs from the manufacturer's recommended efficiency by more than a predetermined amount, then an indication may be provided. The predetermined amount may be, for example, input into the DRSA unit 232 by an operator of the HVAC/R system 100, or may be pre-programed into the DRSA unit 232.

The indication may be provided by, for example, the DRSA unit 232. The indication may be provided at the DRSA unit 232 by, for example, providing a visual indication on the display 244 or in another manner such as, for example, an LED light visible on the housing 302 of the DRSA unit 232. An auditory indication may also be provided by the DRSA unit 232 by, for example, a speaker housed within the housing 302. An indication may also be sent to the portable electronic device 240 or to the monitoring centre 241 to alert an operator that the HVAC/R system 100 may require servicing.

The indicator may include, for example, diagnostic information as well as an urgency level associated with the indicator. For example, an indicator sent in response to a deviation of the HVAC/R system 100 from the manufacturer's recommended operating metrics by a sufficiently large amount may include a higher level of urgency than the level of urgency associated with an indicator sent in response to a smaller deviation.

The indicator may be forwarded according to predetermined instructions. The predetermined instructions may set out the recipient of the indicator. For example, the predetermined instructions may cause the indicator be sent to one or more of the owner of the HVAC/R system 100, the owner's employees, and a designated HVAC/R service technician. The indication may be utilized by the recipient to arrange a service call at the site of the site of the HVAC/R system 100. In another example, the indication may be received by a technician at, for example, the monitoring centre 241, a portable electronic device 240, or both, who may then review the data collected by the HVAC/R analyzing system 200 to assess whether a service call to the location of the HVAC/R system 100 may be desired.

The HVAC/R analyzing system of the present disclosure facilitates determining a first energy transfer value associated with an air handler of an HVAC/R system and a second energy transfer value associated with the refrigerant of the HVAC/R system, and comparing the first and second energy transfer values in order to verify the accuracy of the determined values.

The HVAC/R analyzing system also facilitates remote monitoring of the HVAC/R system over a network. A monitoring centre determines if the HVAC/R system is not operating according the manufacturer's recommended operating metrics, and provides an indicator when the operation of HVAC/R system deviates from the manufacturer's recommending operating metrics. The indicator may provide an alert that a service call to the HVAC/R system may be desired. The remote monitoring capability of the HVAC/R analyzing system also facilitates the HVAC/R system to be diagnosed remotely, enabling a determination of whether or not an on-site service call may be desired.

By indicating that an HVAC/R system's operating has fallen outside of the manufacturer's recommending operating metrics, the HVAC/R analyzing system facilitates early remediation of the HVAC/R system's operation. Early remediation reduces the time that the HVAC/R system is operating at lower efficiencies, reducing the energy consumed by the HVAC/R system, as well as reducing the costs associated with repairs and premature failure of the HVAC/R system.

The HVAC/R analyzing system also facilitates an easy retrofit into older HVAC/R systems by utilizing sensors that wirelessly communicate with the DRSA unit. In an example, the DRSA unit may be a dedicated leave behind "black box" that may be retrofitted into an existing HVAC/R system.

The described embodiments are to be considered in all respects only as illustrative and not restrictive. The scope of the claims should not be limited by the preferred embodiments set forth in the examples, but should be given the broadest interpretation consistent with the description as a whole. All changes that come with meaning and range of equivalency of the claims are to be embraced within their scope.

The invention claimed is:

1. A system for analyzing a heating, air conditioning and refrigeration (HVAC/R) system comprising:
   a receiver for receiving signals from at least a dry bulb air temperature sensor, a wet bulb air temperature sensor, a differential air pressure sensor, a refrigerant mass flow sensor, a refrigerant superheat temperature sensor, a refrigerant subcool temperature sensor, a high pressure sensor, and a low pressure sensor;
   wherein at least one of the refrigerant superheat temperature sensor and the refrigerant subcool temperature sensor comprises two or more temperature sensors;
   a memory for storing a pressure-enthalpy relationship for a refrigerant of the HVAC/R system;
   a processor in communication with the receiver and the memory, the processor configured to:
      determine a first energy transfer value associated with an air handler of the HVAC/R system based on the received signals from the dry bulb air temperature sensor, the wet bulb air temperature sensor, and the differential air pressure sensor;
      determine, based on the signals from the two or more of temperature sensors, an energy value associated with the energy gained or lost by the selected refrigerant in a conduit of the HVAC/R system;
      determine a second energy transfer value associated with the selected refrigerant of the HVAC/R system based on the pressure-enthalpy relationship and the received signals from the refrigerant mass flow, the refrigerant superheat temperature sensor, the refrigerant subcool temperature sensor, the high pressure sensor, and the low pressure sensor, and wherein determining the second energy transfer value is based on the determined energy value;
      verify the determined first and second energy transfer values by determining that a difference between the first energy transfer value and the second energy transfer value is less than a first predetermined amount;
in response to verifying that the difference between the determined first and second energy transfer values is less than the first predetermined amount:
determine, based on at least one of the determined first and second energy transfer values, one of an Energy Efficiency Ratio value, a Seasonal Energy Efficiency Ratio value, and a Coefficient of Performance value;
determine that the one of the Energy Efficiency Ratio value, the Seasonal Energy Efficiency Ratio value, and the Coefficient of Performance value differs from a reference energy efficiency amount by more than a second predetermined amount; and
in response to determining that the one of the Energy Efficiency Ratio value, the Seasonal Energy Efficiency Ratio value, and the Coefficient of Performance value differs from the reference energy efficiency amount by more than the second predetermined amount, provide an indication that the HVAC/R system is not operating optimally.

2. The analyzing system of claim 1, wherein the memory and processor are housed in a portable electronic device separate from the receiver.

3. The analyzing system of claim 1, wherein the first predetermined amount is 10% of one of the first energy transfer value and the second energy transfer value.

4. The analyzing system of claim 1, comprising a transmitter for transmitting the signals received at the receiver, and the indicator, over a network to facilitate remote monitoring of the HVAC/R system.

5. The analyzing system of claim 1, wherein the processor is configured to store a log of the received signals in the memory.

6. The analyzing system of claim 1, comprising a portable electronic device configured to determine a model number of the HVAC/R system, retrieve information associated with the model number including the reference energy efficiency, and store the retrieved information in the memory.

7. The analyzing system of claim 6, wherein the portable electronic device comprises a camera, and the portable electronic device is configured to capture, utilizing the camera, an image of the model number, and determining the model number comprises determining the model number based on the image.

8. A method of controlling an analyzing system of a heating, air conditioning and refrigeration (HVAC/R) system comprising:
receiving signals from at least a dry bulb air temperature sensor, a wet bulb air temperature sensor, a differential air pressure sensor, a refrigerant mass flow sensor, a refrigerant superheat temperature sensor, a refrigerant subcool temperature sensor, and a high pressure sensor, and a low pressure sensor;
wherein at least one of the refrigerant superheat temperature sensor and the refrigerant subcool temperature sensor comprises two or more temperature sensors;
determining a first energy transfer value associated with an air handler of the HVAC/R system based on the received signals from the dry bulb temperature sensors, the wet bulb temperature sensors, and differential air pressure sensor;
determining, based on the signals from the two or more of temperature sensors, an energy value associated with the energy gained or lost by the selected refrigerant in a conduit of the HVAC/R system;
determining a second energy transfer value associated with a refrigerant of the HVAC/R system based a pressure-enthalpy relationship of the refrigerant and the received signal from the refrigerant mass flow sensor, the refrigerant superheat temperature sensor, the refrigerant subcool temperature sensor, the high pressure sensor, and the low pressure sensor, wherein determining the second energy transfer value is based on the determined energy value;
verifying the determined first and second energy transfer values by determining that a difference between the first energy transfer value and the second energy transfer value is less than a first predetermined amount;
in response to verifying that the difference between the determined first and second energy transfer values is less than the first predetermined amount:
determining, based on at least one of the determined first and second energy transfer values, one of an Energy Efficiency Ratio value, a Seasonal Energy Efficiency Ratio value, and a Coefficient of Performance value;
determining that the one of the Energy Efficiency Ratio value, the Seasonal Energy Efficiency Ratio value, and the Coefficient of Performance value differs from a reference energy efficiency amount by more than a second predetermined amount; and
in response to determining that the one of the Energy Efficiency Ratio value, the Seasonal Energy Efficiency Ratio value, and the Coefficient of Performance value differs from the reference energy efficiency amount by more than the second predetermined amount, providing an indication that the HVAC/R system is not operating optimally.

9. The method of claim 8, comprising selecting a refrigerant from a plurality of refrigerants.

10. The method of claim 8, wherein the predetermined amount is 10% of one of the first energy transfer value and the second energy transfer value.

11. The method of claim 8, comprising transmitting the received signals and the indication over a network to facilitate remote monitoring of the HVAC/R system.

12. The method of claim 8, comprising determining a model number of the HVAC/R system, retrieving information including the reference energy efficiency associated with the HVAC/R system based on the model number, and storing the information in a memory.

13. The method of claim 12, wherein a portable electronic device determines the model number based on an image of the model number and retrieves information associated with the HVAC/R system.

* * * * *